United States Patent [19]
Ford

[11] Patent Number: 5,918,768
[45] Date of Patent: *Jul. 6, 1999

[54] POWDERED BEVERAGE MIXING AND DISPENSING APPARATUS

[75] Inventor: David F. Ford, Springfield, Ill.

[73] Assignee: Bunn-O-Matic Corporation, Springfield, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/685,702

[22] Filed: Jul. 24, 1996

[51] Int. Cl.$^6$ .......................................................... B67D 5/56
[52] U.S. Cl. ................... 222/113; 222/129.3; 222/146.2; 222/236; 222/241
[58] Field of Search .............................. 222/146.2, 146.5, 222/129.1, 129.3, 129.4, 113, 236, 241

[56] References Cited

U.S. PATENT DOCUMENTS

| | | | |
|---|---|---|---|
| 2,658,645 | 1/1953 | Harris, Jr. . | |
| 3,266,670 | 8/1966 | Brooks et al. | 222/129.4 X |
| 3,268,119 | 8/1966 | Kopera | 222/129.1 |
| 3,385,569 | 5/1968 | Bookout | 222/129.4 X |
| 3,446,137 | 5/1969 | Pryor et al. . | |
| 3,568,887 | 3/1971 | Jacobs et al. | 222/129.4 X |
| 3,671,020 | 6/1972 | Krup | 222/129.4 X |
| 3,737,076 | 6/1973 | Gardner, Jr. et al. | 222/129.4 X |
| 4,015,749 | 4/1977 | Arzberger et al. | 222/129.4 X |
| 4,068,781 | 1/1978 | Toth . | |
| 4,139,125 | 2/1979 | Arzberger et al. | 222/129.4 |
| 4,172,669 | 10/1979 | Edelbach | 222/129.4 X |
| 4,194,651 | 3/1980 | Martin et al. | 222/129.4 X |
| 4,207,995 | 6/1980 | Neely | 222/236 X |
| 4,487,337 | 12/1984 | DeJardins | 222/129.3 |
| 4,595,131 | 6/1986 | Ruskin et al. | 222/129.1 X |
| 4,676,401 | 6/1987 | Fox et al. | 222/129.1 X |
| 4,688,474 | 8/1987 | Anderl . | |
| 4,934,563 | 6/1990 | Torita et al. | 222/236 X |
| 5,158,793 | 10/1992 | Helbling . | |
| 5,192,002 | 3/1993 | Reese et al. | 222/129.4 X |
| 5,303,639 | 4/1994 | Bunn et al. . | |
| 5,312,020 | 5/1994 | Frei | 222/129.1 |
| 5,372,832 | 12/1994 | Bunn et al. . | |
| 5,393,540 | 2/1995 | Bunn et al. . | |

FOREIGN PATENT DOCUMENTS

2140390  4/1984  United Kingdom .

*Primary Examiner*—Kenneth Bomberg
*Attorney, Agent, or Firm*—Trexler, Bushnell, Giangiorgi & Blackstone, Ltd.

[57] ABSTRACT

A powdered beverage mixing and dispensing apparatus which combines a powdered beverage substance and water to produce a desired beverage, for example cappuccino, hot chocolate, as well as other beverages which may be provided in powdered form. The apparatus includes at least one hopper having a powdered beverage stirring and dispensing mechanism which stirs the powder to further prevent caking and to controllably dispense a desired quantity of powder from the hopper. A water dispensing system is provided with the apparatus to controllably dispense a quantity of water for mixing with a quantity of powder dispensed from the hopper. A mixing assembly communicates with the hopper and with the water dispensing system to combine powder and water. The mixing assembly includes a frothing mechanism extending into a whipping chamber which communicates with a mixing chamber to mechanically agitate the powder and water combined in the mixing chamber. A vapor removal assembly is provided between the mixing chamber and the hopper to remove moist air from the mixing assembly to prevent intrusion of such moist air into the hopper and absorption by the beverage powder. A vent tube is provided in the heated water dispensing system to promote draining of a dispensing line communicating with the mixing chamber and to prevent the accumulation of gas bubbles in the dispensing line. A by-pass water system is provided in the apparatus which communicates with a water dispensing line to controllably introduce unheated water into the water dispensing system. Additionally, an illuminated display is provided on a front portion of the apparatus.

39 Claims, 7 Drawing Sheets

POWDERED BEVERAGE MIXING AND DISPENSING APPARATUS

BACKGROUND

The present invention relates to a powdered beverage mixing and dispensing apparatus. The apparatus dispenses a powdered beverage substance and mixes it with water to produce a desired beverage.

Prior art beverage mixing devices encountered problems as a result of the powdered beverage substance forming clumps and cakes. The beverage substance powder is hydroscopic and thus readily absorbs moisture. Prior art beverage mixing devices typically used hot water and, as a result, produced steam or water vapor within the beverage apparatus. The entrapped water vapor was absorbed by the hydrophilic powder, resulting in caking of the powder. The caked or clumped powder tended to clog the hoppers and impede dispensing of the powder. As a result of the impeded powder dispensing, the beverage produced by such apparatus was inconsistent. Furthermore, the powder clumping problem required additional maintenance in order to break up the clumps and clear any dispensing tubes.

Another problem encountered with prior art powdered beverage dispensing mixing apparatus is that they tended to produce inconsistent beverages from the powdered beverage substance. One of the problems causing inconsistent beverages was the inability to thoroughly and effectively mix or blend the powder with a desired quantity of water to produce the resulting reconstituted beverage. Some prior art devices attempted to reconstitute beverage powders, for example hot cocoa mix powder, using only water forces to mix the powder with the water. In other words, water was injected into a mixing chamber and mixed with the beverage powder therein to produce the beverage. If variables associated with the water were altered, such as injection speed, the powder may not thoroughly mix and, as a result, produce an inconsistent beverage.

Additionally, prior art beverage apparatus did not produce a desired froth on top of the resultant beverage coffee drinks. For example, powdered beverage substances are available to produce cappuccino-type coffee beverages. In producing a cappuccino-type coffee beverage, it is desirable to have a layer of foam or froth on top of the beverage. This is desirable as it replicates the cappuccino beverages which are produced manually by the operator of a coffee bar. The coffee bar operator produces the froth by heating milk to produce a steamed and frothed milk substance which is poured over espresso to ultimately produce the cappuccino beverage. Prior art automatic beverage devices using powdered cappuccino beverage powder tended not to produce or inconsistently produce froth on top of the beverage produced from the beverage powder.

Still another problem encountered with prior art powdered beverage mixing and dispensing apparatus is that the temperature of the resultant beverage tended to be inconsistent. The temperature of the beverage was inconsistent as a result of the hot water line retaining a quantity of heated water between dispensing cycles. For example, during a dispensing cycle, hot water is transported through a dispensing line for mixing with the powdered beverage substance. Prior to a subsequent mixing cycle, the hot water which did not drain from the dispensing line tended to cool, resulting in a quantity of water which would not thoroughly mix with the beverage powder and producing inconsistent hot beverages. The inconsistency was manifested in both the temperature as well as the mixing of the powder with the water.

The dispensing lines in prior art apparatus also created another problem with regard to the flow rate therethrough. The prior art beverage apparatus tended to allow bubbles to settle out of the heated water as it cooled within the line. During a subsequent dispensing cycle, the air bubbles created turbulence in the water, thereby reducing the flow rate through the dispensing line. In order to counteract this problem, prior art devices placed a hole in the solenoid valve through which water is dispensed. The hole in the solenoid valve tended to draw air into the water flow, causing the resulting mixture of water and powder to be excessively frothy or foamy.

Prior art beverage mixing and dispensing apparatus also encountered problems with clumping and caking of the powder as a result of failing to mix or agitate the powder retained in the hopper. While some devices may have employed mixers or agitators within the hoppers, however, such mixers or agitators do not provide sufficient agitation of the powder to assure clump-free operation.

Finally, prior art beverage mixing and dispensing apparatus did not provide devices to draw a customer's attention to the apparatus. It has been found that it would be desirable to actively draw a customer's attention to the apparatus in an attempt to induce purchases and increase sales of such beverages. Some prior art apparatus may have used passive attraction techniques, such as graphics on the front of the device. However, these techniques were passive and did not actively draw a patron's attention towards the apparatus and the information set forth on the display graphic.

For the foregoing reasons, it would be desirable to provide a beverage mixing and dispensing apparatus which overcomes one or more of the above-stated problems.

OBJECTS AND SUMMARY

A general object satisfied by the claimed invention is to provide a powdered beverage mixing and dispensing apparatus which thoroughly and consistently mixes powdered beverage substances with water to produce a desired resultant beverage.

Another object of the present invention is to provide a beverage mixing and dispensing apparatus which produces froth on the top of a beverage dispensed therefrom.

Another object of the present invention is to provide a powdered beverage mixing and dispensing apparatus which prevents the intrusion of moist air and/or water vapor into storage supplies of powdered beverage substances.

Still a further object of the present invention is to provide a powdered beverage mixing and dispensing apparatus which thoroughly, mechanically mixes powdered beverage substances and water to provide a consistent desired resultant beverage.

Still a further object satisfied by the present invention is to provide a powdered beverage mixing and dispensing apparatus having a stirring mechanism which stirs the powdered beverage substance retained in a storage hopper to further reduce caking and clumping.

Yet another object satisfied by the present invention is to provide a powdered beverage mixing and dispensing apparatus which provides consistent delivery of heated water for mixing with a powdered beverage substance to produce a consistent desired resultant beverage.

Still a further object satisfied by the present invention is to provide a powdered beverage mixing and dispensing apparatus which allows selective use of cool water as well as heated water for mixing with a beverage substance powder.

An even further object of the present invention is to provide a beverage mixing and dispensing apparatus which actively attracts the attention of a patron to convey information to promote ordering and sales of the beverages produced thereby.

Briefly, and in accordance with the foregoing, the present invention envisions a powdered beverage mixing and dispensing apparatus which combines a powdered beverage substance and water to produce a desired beverage, for example cappuccino, hot chocolate, as well as other beverages which may be provided in powdered form. The apparatus includes at least one hopper having a powdered beverage stirring and dispensing mechanism which stirs the powder to further prevent caking and to controllably dispense a desired quantity of powder from the hopper. A water dispensing system is provided with the apparatus to controllably dispense a quantity of water for mixing with a quantity of powder dispensed from the hopper. A mixing assembly communicates with the hopper and with the water dispensing system to combine powder and water. The mixing assembly includes a frothing mechanism extending into a whipping chamber which communicates with a mixing chamber to mechanically agitate the powder and water combined in the mixing chamber. A vapor removal assembly is positioned between the mixing chamber and the hopper to remove moist air from the mixing assembly to prevent intrusion of such moist air into the hopper and absorption by the beverage powder. A vent tube is provided in the heated water dispensing system to promote draining of a dispensing line communicating with the mixing chamber and to prevent the accumulation of gas bubbles in the dispensing line. A by-pass water system is provided in the apparatus which communicates with a water dispensing line to controllably introduce unheated water into the water dispensing system. Additionally, an illuminated display is provided on a front portion of the apparatus.

DESCRIPTION

Figure 1:
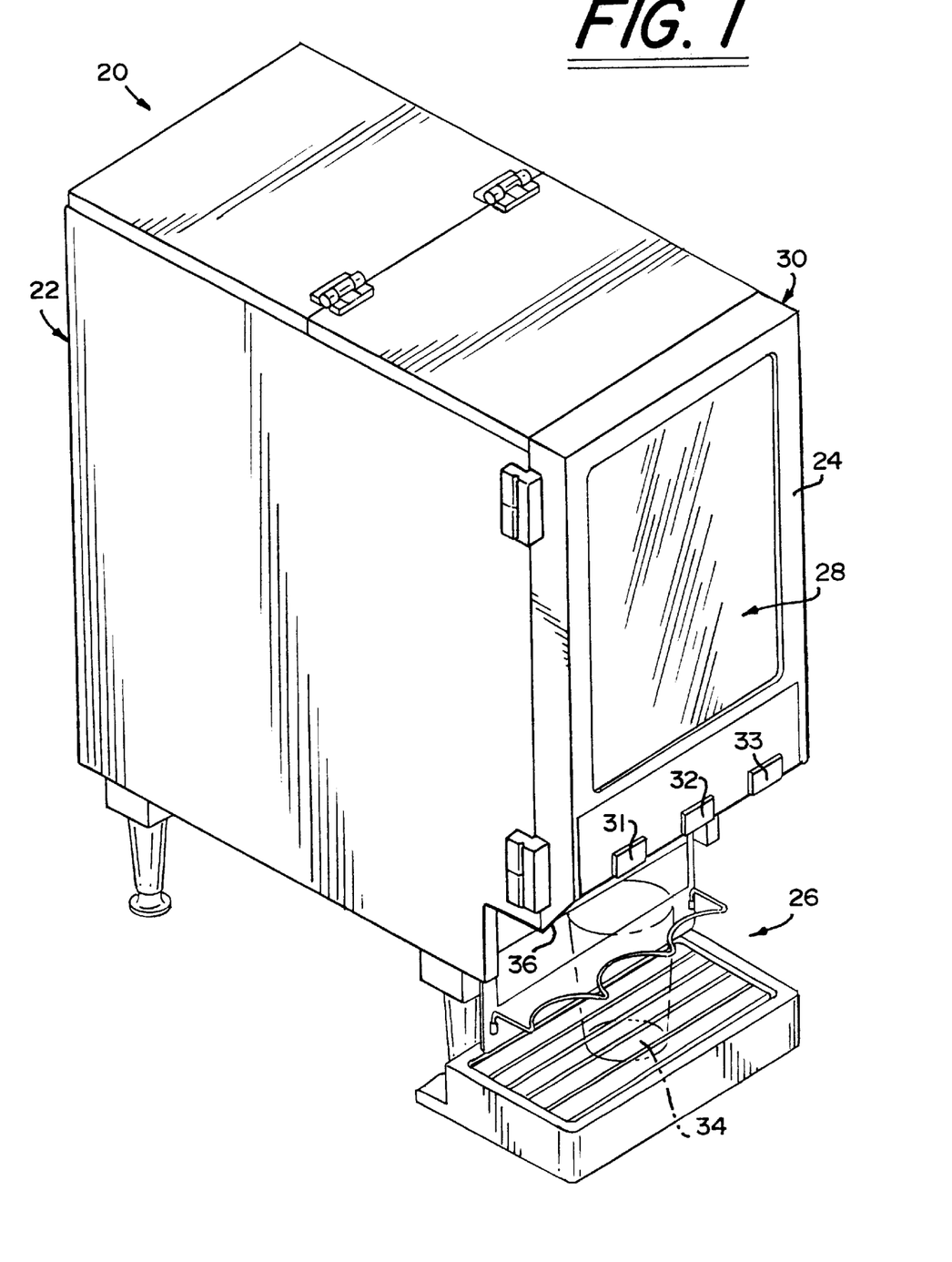
FIG. 1 is a perspective view of a powdered beverage mixing and dispensing apparatus of the present invention.

As shown in FIG. 1, a powdered beverage mixing and dispensing apparatus 20, hereinafter referred to as the beverage apparatus 20, includes a housing 22 having a front surface 24 and a beverage dispensing area 26. The front surface 24 includes an illuminated display 28 associated with a front door 30 and as will be described in greater detail herein below. Selection switches 31, 32, 33 are also provided on the front surface 24 for selecting a desired beverage for dispensing into a container or cup 34 positioned in the beverage dispensing area 26. As will be described in greater detail herein below, a lower edge of the front door 30 has a beveled surface 36 which allows an operator to view the dispensing of a beverage from the apparatus 20 into the cup 34 in the dispensing area 26.

Figure 2:
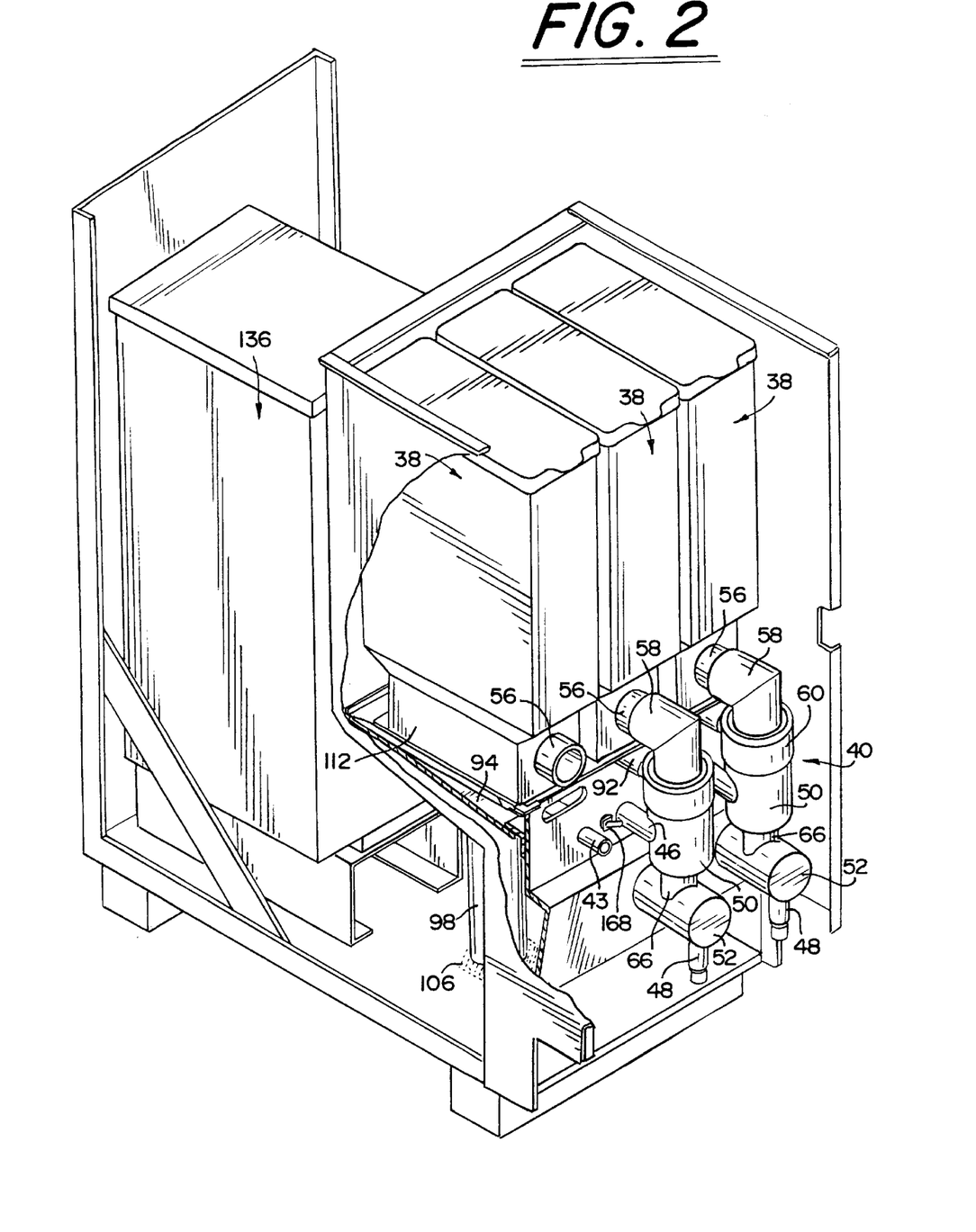
FIG. 2 is a partial fragmentary, partial cross-sectional, perspective view of internal components of the powdered beverage mixing and dispensing apparatus as shown in FIG. 1.
Figure 5:
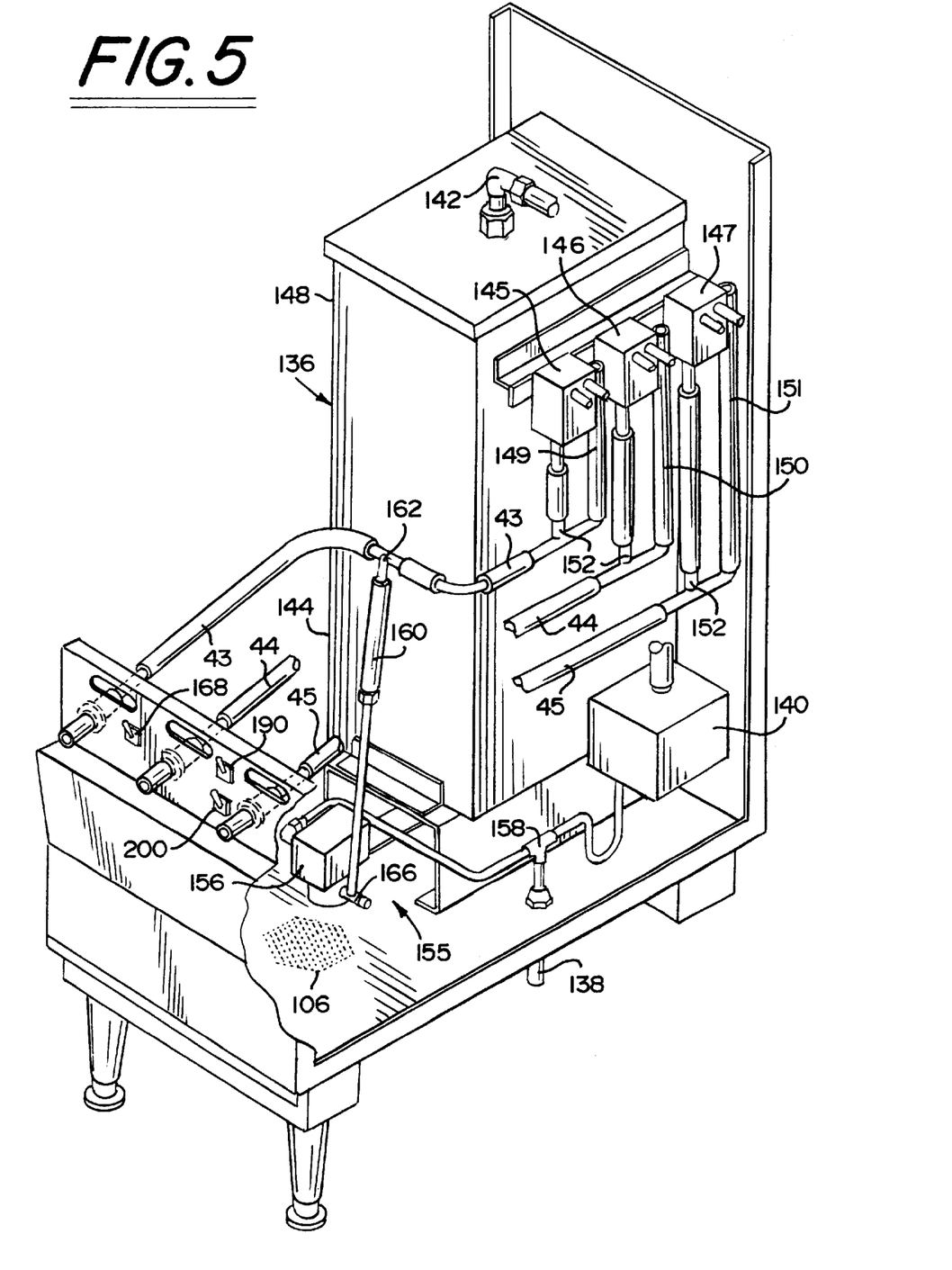
FIG. 5 is a partial fragmentary, partial cross-sectional, perspective view of a water dispensing system of the present invention which prevents the accumulation of gas bubbles in heated water dispensing lines and which promotes the draining of the heated water dispensing lines upon completion of a dispensing cycle, also shown is a water by-pass system which introduces reduced temperature water for mixing with a powdered beverage substance.

FIGS. 2 and 5 provide perspective views from two different perspective angles of the apparatus 20 with portions of panels of the housing removed. As shown in FIG. 2, the housing 22 has been fragmented to reveal three hoppers 38 in which is stored a powdered beverage substance. A mixing assembly 40 is positioned in close proximity to each of the hoppers 38. With further reference to FIG. 5, a water distribution system 42 (described in greater detail herein below) delivers water through water dispensing lines 43, 44, 45 which are coupled to inlet ports 46 of corresponding mixing assemblies 40. Powder is dispensed from the hopper 38 into a corresponding one of the mixing assemblies 40 and mixed with water from the inlet port 46. The mixture is mechanically agitated in the mixing assembly 40 and dispensed through a dispensing nozzle 48.

Figure 3:
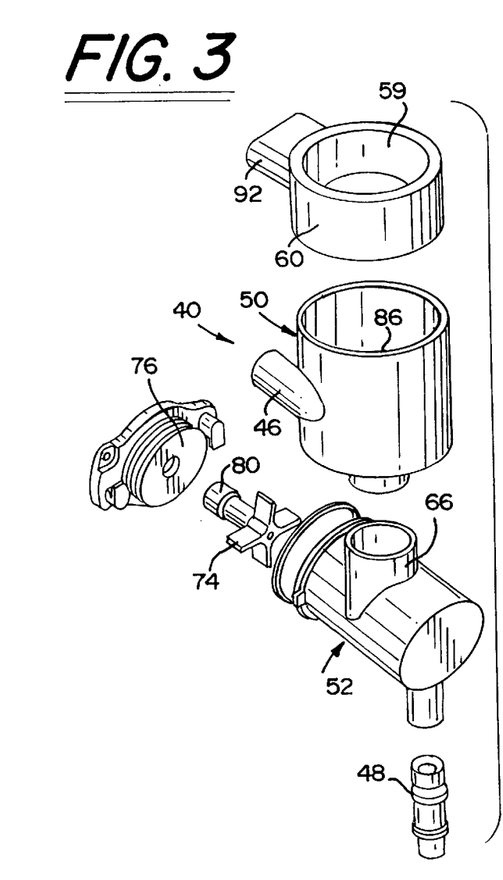
FIG. 3 is an enlarged, exploded, perspective view of a mixing assembly, which mixing assembly attaches to a powder hopper, an inlet water line, an exhaust vent, and dispenses a beverage through a dispensing nozzle.
Figure 4:
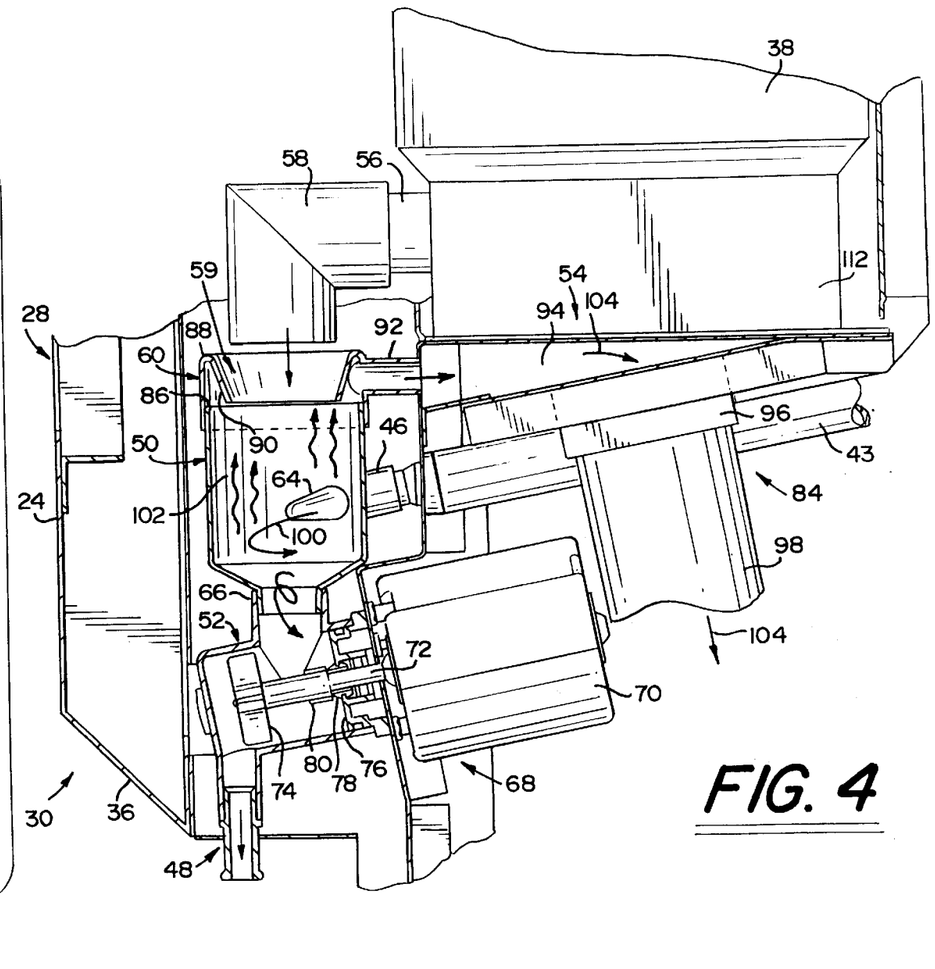
FIG. 4 is an enlarged, partial fragmentary, partial cross-sectional side elevational view of a mixing assembly as shown in FIG. 2 and as shown in the exploded perspective view of FIG. 3.

With further reference to FIGS. 3 and 4, the mixing assembly 40 includes a mixing chamber 50 connected to and communicating with a whipping chamber 52. A moisture removal assembly 54 (described in greater detail herein below) is positioned between the mixing chamber 50 and the corresponding hopper 38. During a dispensing cycle, beverage powder is dispensed from the hopper 38 through a dispensing outlet 56 and an ejector elbow 58. A moisture collector portion 60 of the moisture removal system 54 defines an entry port 59 through which powder is dispensed from the ejector elbow 58. Powder passes through the entry port 59 into the mixing chamber 50. Water is dispensed during the beverage dispensing cycle through a water dispensing line 43, 44, 45 through the inlet port 46 on the corresponding mixing chamber 50 and through a tangentially oriented entry aperture 64. The tangential entry aperture 64 introduces the water in a tangential orientation to produce and promote swirling action of the water in the mixing chamber 50. The swirling action promotes the mixing of the powder with the water and the cleansing of the mixing chamber surfaces.

The combined powder and water mixture drains from the mixing chamber 50 into the whipping chamber 52 through a chamber interface coupling 66. A frothing mechanism 68 is associated with the whipping chamber 52 to mechanically agitate the powder and water mixture. The frothing mechanism 68 assures thorough and consistent mixing of the powder and water and produces a froth on top of the resultant beverage. The frothing mechanism 68 includes a motor 70 having a shaft 72 extending into the whipping chamber 52. A frothing blade 74 is attached to a distal end of the shaft 72. The motor 70 rotates the shaft 72 and the attached frothing blade 74 to mechanically agitate the powder and water mixture. Agitation quickly and thoroughly mixes the powder and water combination to assure complete dissolving of the powder in the water. Additionally, the agitation introduces small air bubbles into the mixture which produces a froth which rises to the top of the finished beverage. Such a froth is desirable for beverages such as hot chocolate and cappuccino. The resultant beverage is dispensed from the whipping chamber 52 through the dispensing nozzle 48.

It should be noted that the shaft 72 extends through a wall 76 of the whipping chamber 52. A resilient seal 78 is provided around the shaft 72 to provide a seal between the whipping chamber 52 and the motor 70. The seal 78 helps to keep liquid inside the whipping chamber 52 and helps to minimize leaking from the whipping chamber 52. Due to the high speed and low torque of the motor 70, the seal 78 must be provided as a low friction seal to prevent the buildup of heat and resistance on the shaft 72 and motor 70 and to prevent overloading the motor 70. However, the shaft seal 78 tends to oscillate or wiggle as the shaft 72 rotates. As a result, some liquid may leak between the seal 78 and the shaft 72. A collar 80 is provided on the shaft 72 in close proximity to, without contacting, the seal 78. The collar 80 provides a hydrodynamic seal which centripetally spins liquid away from the seal 78 and shaft 72 thus further preventing leakage of liquids between the seal 78 and shaft 72.

As briefly discussed above, the present invention also includes the moisture removal assembly 54. The moisture removal assembly 54 includes the moisture collector 60 and the exhaust assembly 84. The moisture collector 60 is positioned on an upper end 86 of the mixing chamber 50. An annular channel structure 88 is defined by the moisture collector 60 having a mouth 90 which opens towards the mixing chamber 50. As noted above, the moisture collector 60 also defines an entry port 59 generally through the center thereof. The annular channel structure 88 communicates with a vent tube 92 which, in turn, communicates with an enclosed passage 94. The passage 94 communicates with the exhaust assembly 84 which induces a positive air flow through the vent tube 92 and passage 94 to exhaust air from the mixing chamber 50. The exhaust assembly 84 includes a vent fan 96 and an exhaust tube 98.

Air (104) removed from the mixing chamber 50 is exhausted through the exhaust tube 98 externally of the apparatus 20 through a vent 106 (see FIG. 5) in a bottom portion of the apparatus housing. By exhausting the air externally of the apparatus, the moisture level inside the apparatus is maintained at a reduced level to further prevent clumping and caking of the beverage powder substance.

In operation, the vent fan 96 is activated to produce a positive air flow away from the moisture collector 60. As hot water (100) is dispensed into the mixing chamber 50, steam (102) rises upwardly from the mixing chamber 50. The positive air flow (104) created by the exhaust assembly 84 removes steam or moist air collected in the annular channel structure 88 through the vent tube 92 communicating therewith. As such, moist air is collected and removed from the mixing chamber 50 through the moisture removal assembly 54. The moisture removal assembly 54 is important because moist air is not allowed to flow through the ejector elbow 58 into the hopper 38. This novel feature of the present invention helps to minimize or eliminate clumping and caking of the beverage powder substance in the hopper 38 and thus promotes more efficient and consistent operation of the apparatus 20.

Figure 6:
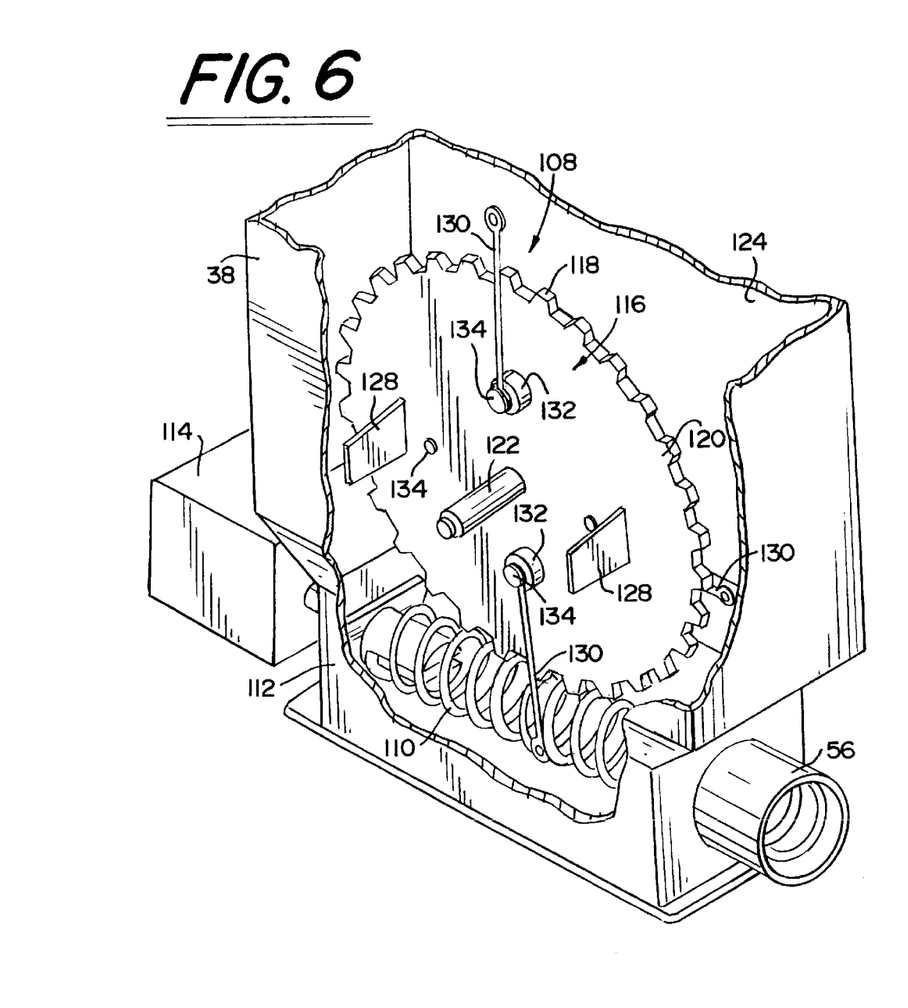
FIG. 6 is a partial fragmentary, partial cross-sectional, perspective view of a hopper of the present invention and the stirring mechanism retained within the hopper for breaking up clumps and preventing caking of a powdered beverage substance retained within the hopper.
Figure 7:
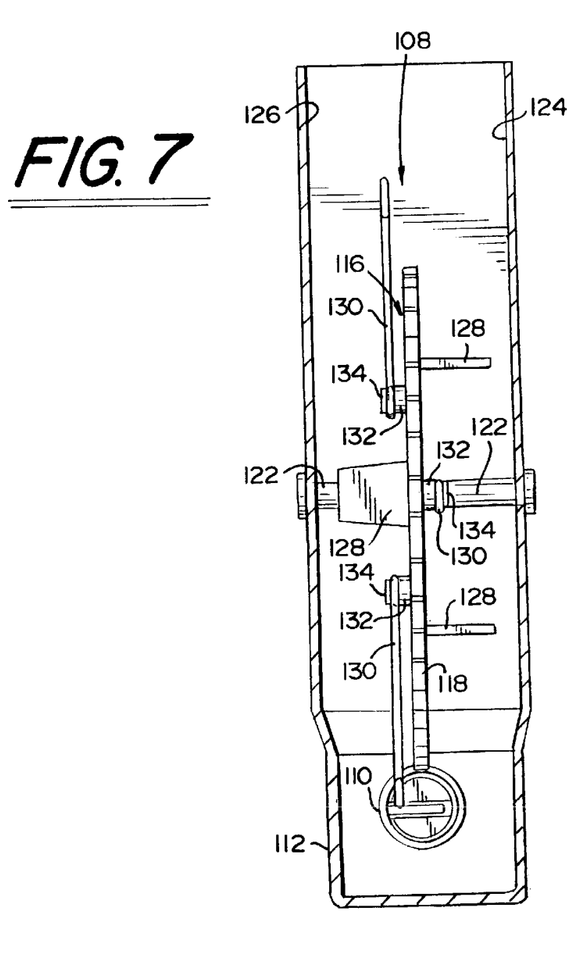
FIG. 7 is a partial fragmentary, cross-sectional, side elevational view of the hopper and stirring mechanism as shown in FIG. 6 further showing the engagement and alignment of various components within the stirring mechanism.

Turning now to FIGS. 6 and 7 which provide partial fragmentary and cross-sectional views of the hopper 38 and a stirring and dispensing mechanism 108 associated therewith. More specifically, the stirring and dispensing mechanism 108 includes an auger 110 positioned in a lower portion 112 of the hopper 38. An auger motor 114 positioned externally of the hopper 38 is connected to and drives the auger 110. Operation of the auger 110 advances powder in the lower portion 112 of the hopper 38 towards the dispensing outlet 56 and through the ejector elbow 58.

The stirring and dispensing mechanism 108 also includes an agitator disk 116 which is a generally planer disk having teeth 118 positioned on the circumferential edge 120 thereof. The agitator disk 116 is retained on a spring-loaded agitator axle 122 retained between opposite sides 124, 126 of the hopper 38. Spacing of the auger spiral and the position of the teeth 118 has been sized and dimensioned such that the teeth 118 engage the auger 110. Engagement of the agitator disk 116, via the teeth 118, with the auger 110 results in rotation of the agitator disk 116 upon operation of the auger 110 by the auger motor 114. As such, operation of the auger 110 during a dispensing cycle will cause the agitator disk 116 to rotate about the axle 122 to help break up any clumping or settling of the powder retained in the hopper 38.

Additionally, the agitator disk 116 includes fins 128 which extend from the generally planer surface thereof As shown in FIG. 7, the fins 128 extend from both sides of the agitator disk 116 generally perpendicular thereto and are spaced in alternate pairs such that the two fins 128 on one side are not spaced directly across from the two fins 128 on the other side. This alternate spacing can be seen as shown in FIGS. 6 and 7.

Still a further feature of the stirring and dispensing mechanism 108 includes agitator wires 130 which are attached to the agitator disk 116. A shoulder 132 is provided on the agitator disk 116 to space each wire 130 away from the surface of the disk. A pin 134 extends through a portion of each wire 130 to secure each wire 130. The wires 130 flex as the disk 116 is rotated. Further, the wires 130 are sufficiently long so as to extend into the path of the auger 110 thereby helping to break up clumps in the auger path and removing powder from the auger surface. This action of the agitator wires 130 helps to further promote the mixing and loosening of the powder to minimize and counteract caking.

As mentioned herein above, the apparatus 20 includes a water dispensing system 42 which dispenses water through a water dispensing line 44 to the mixing chamber 50. Water dispensed through the dispensing line 44 is retained in a heated water reservoir 136 prior to dispensing. Water is introduced to the apparatus 20 through an inlet line 138 which communicates with an inlet solenoid valve 140 to control the in-flow of water. The solenoid 140 is connected to an inlet coupling 142 which is connected to a tube extending towards a lower portion 144 of the reservoir 136. A heater (not shown) is positioned in the lower portion 144 to heat the unheated incoming water. The tube (not shown) extending through the reservoir 136 towards the lower portion 144 and the heater retained therein are of generally known construction. A series of individually controllable dispensing solenoid valves 145, 146, 147 are positioned in close proximity to and communicate with an upper portion 148 of the reservoir 136. When the solenoid valves 145, 146, 147 are operated, water flows from the upper portion 148 into the corresponding dispensing line 44. Each dispensing line is positioned on an incline from the corresponding solenoid valve 145, 146, 147 to the corresponding mixing chamber 50. As a result, water flows from the solenoid valve 145, 146, 147 when operated to the open position, towards the mixing chamber 50 under the influence of gravity.

A vent tubes 149, 150, 151 is connected to each of a corresponding dispensing lines 43, 44, 45. The vent tube 150 is connected to the corresponding dispensing line 44 at "T"-fittings 152, 153, 154. The "T"-fittings 152, 153, 154 are positioned below the dispense valves 145, 146, 147. When the dispense valve is opened, water flows from the upper portion 148 of the reservoir 136 through the valves 145, 146, 147 downwardly to the "T"s 152, 153, 154 and into the dispensing lines 43, 44, 45. By connecting the vents 149, 150, 151 to the "T"s 152, 153, 154 some water flowing through the dispense lines 43, 44, 45 will back up into the vent tubes 149, 150, 151 sealing off the vent and not allowing air to be pulled through the vents 149, 150, 151 into the dispensing line. When the dispense valve 145, 146, 147 are closed, water drains from the dispense lines 43, 44, 45 as a result of the vent tubes 149, 150, 151 communicating with the ambient atmosphere.

Without the vent, hot water would be trapped in the dispense lines 43, 44, 45. As the heated water cooled, small air bubbles from the heated water may evolve from the water and collect into larger bubbles. The large bubbles may create blockage in the dispensing line creating turbulence on a subsequent dispensing cycle. The increased turbulence in the dispense line will reduce the flow rate regardless of the valve settings and thus create inconsistent flow. The inconsistent flow will result in inconsistent quantities of water being dispensed into the mixing chamber and thus inconsistent resultant beverages. Some prior art devices, as mentioned hereinabove, have attempted to resolve the bubble problem by adding a vent in the dispensing valve. The vent consists of a hole drilled into a side of the valve near a diaphragm seat of the valve. The vent, however, in the prior art devices, acts as a venturi which draws air into the liquid in the dispensing line and, as a result, creates inconsistent flow.

As a further consideration in the water dispensing system 42 of the present invention, a by-pass water system 155 is provided to introduce unheated water into at least one dispensing line 43. Although FIG. 5 shows the by-pass water system 155 introducing unheated water into only one dispensing line 43, it should be appreciated that multiple systems may be provided to introduce unheated water into each dispensing lines 43, 44, 45. The by-pass water system 155 includes a by-pass solenoid valve 156 which communicates with the inlet line 138 by way of an inlet "T" connection 158. The valve 156 is also connected to a by-pass line 160 which is connected to the dispensing line 44 by way of a by-pass "T" 162. Additionally, an adjustment valve 166 in the form of a needle valve is positioned between the by-pass line 160 and the solenoid valve 156. The adjustment valve 166 allow for control of the flow rate of the by-pass water through the by-pass line 160 when the solenoid 156 is operated.

In use, the by-pass water system 155 allows unheated water to flow into the mixing assembly 50. In the embodiment as shown in FIG. 5, a toggle switch 168 is provided to activate the by-pass solenoid valve 156. The toggle switch is coupled to the corresponding dispensing valve 145 so that when a dispensing cycle is initiated, water will flow directly from the inlet line 138 through the by-pass water system 155 to the dispensing line 43. In this manner, unheated water is introduced to the mixing chamber 50 and the dispense valve 145, disabled by the toggle switch 168, will not allow heated water to flow from the heated water reservoir 136. If unheated beverages are desired from all of the selection points, the heater (not shown) can be deactivated, thereby resulting in the reservoir being an unheated water reservoir. The dispense valves 145, 146, 147 will operate in the usual manner.

Figures 8, 9:
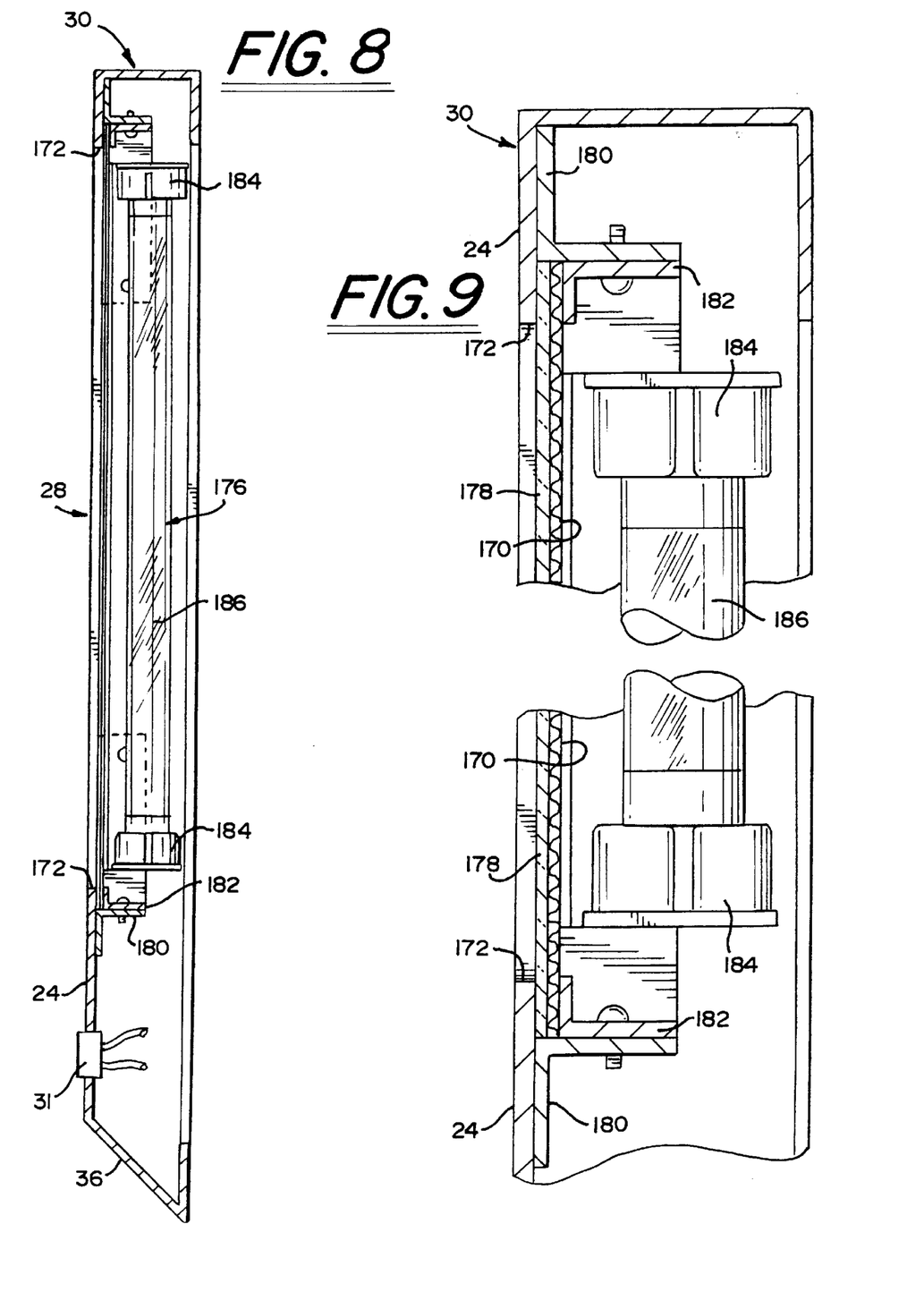
FIG. 8 is a partial fragmentary, cross-sectional, side elevational view of a door which is attached to a front portion of the beverage mixing and dispensing apparatus, which door employs an illumination source to illuminate a display panel retained on the door.
FIG. 9 is a partial fragmentary, cross-sectional, side elevational view of a portion of the door which retains the display panel in position.

With further reference to FIGS. 1, 4, 8 and 9, the illuminated display 28 on the front surface 24 of the front door 30 is shown. As shown in FIG. 8, the illuminated display 28 includes a display panel 170 positioned over a window 172 formed in a frame structure 174 of the door 30. A lamp assembly 176 is retained within the frame structure 174 to provide illumination from a back side of the display panel 170. With reference to FIG. 9, a protective panel 178 of a transparent material such as plastic or glass may be provided over the window to protect the display panel 170.

The panel 178 and display 170 are clamped in position by a mounting structure 180 secured to an inside surface of the frame 174 and a window clamp 182 attachable to the mounting structure 180. The removable clamp 182 allows the display panel 170 to be removed and replaced to provide a variety of displays or to change displays for advertising purposes. The lamp assembly 176 includes a lamp fixture 184 and a lamp element 186 in the form of a fluorescent tube. The illuminated display panel of the present invention is important to provide an active mechanism to draw a patron's attention to the powdered beverage mixing and dispensing apparatus in the interest of enticing selection and purchase of beverages.

Figure 10:
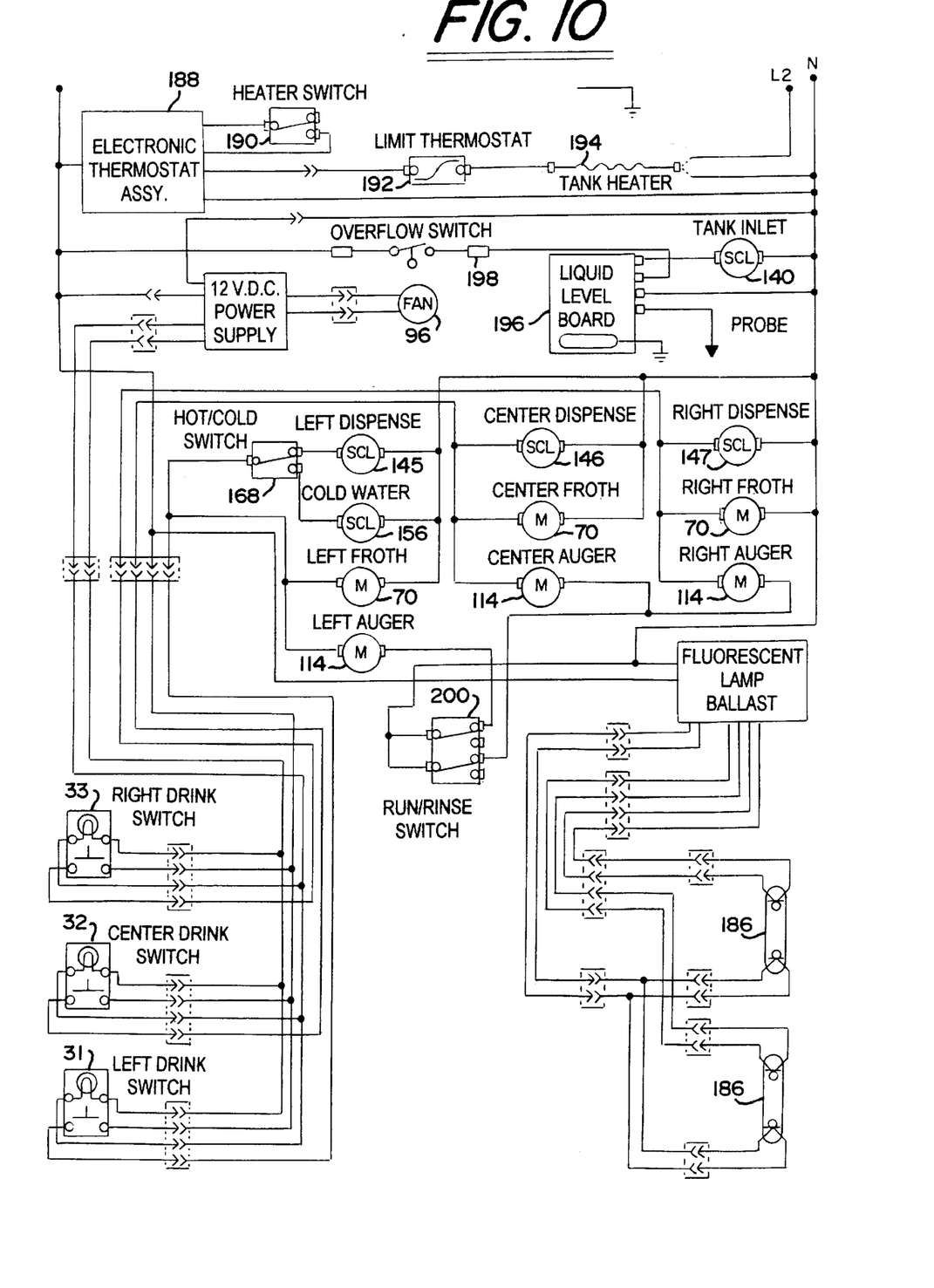
FIG. 10 is a schematic diagram of the invention.

Having now described the overall structures and functions of the present invention, we turn to FIG. 10 which is the schematic diagram of the present invention. In use, the water dispensing system 42 includes an electronic thermostat assembly 188 which is coupled to a heater switch 190. When the heater switch 190 is activated, the thermostatic assembly 188 and the limit thermostat 192 are active and a tank heater 194 is activated. The tank heater 194 is retained within the heated water reservoir 136 and heats the water retained therein.

The inlet solenoid valve 140 is coupled to a liquid level board 196 which is also coupled to an overflow switch 198. In the event that an overflow condition occurs in the reservoir 136, the overflow switch 198 will prevent the overflow condition and thus deactivate the inlet solenoid 140 to prevent continued or excessive overflow. If the heater switch 190 is deactivated, the tank heater 194 is also deactivated and the water retained in the reservoir 136 will be unheated water as opposed to heated water. The unheated water from the reservoir will allow an unheated or cold water beverage to be produced. However, selection of the unheated reservoir supply will require considerable heat-up time if heated beverages are desired.

A run/rinse switch 200 is provided to selectively operate the auger motor 114. In the "run" mode, the auger motor 114 will operate when the corresponding switch 31, 32, 33 is activated. In this condition, the hopper motor is connected to a timer/power supply board. The timer acts as a time delay for the auger motor 114, delaying the start of the activation of the auger motor 114 approximately 0.75 seconds after activation of the switch 31, 32, 33. The time delay allows water to be dispensed by the corresponding solenoid 145, 146, 147 into the mixing chamber 50. Dispensing water into the chamber before dispensing powder will help to assure that all of the powder dispensed into the chamber will be thoroughly mixed and that the walls will be wetted to thoroughly rinse the powder into the whipping chamber.

When the run/rinse switch 200 is in the "rinse" mode, the auger motor 114 will not be activated when the corresponding switch 31, 32, 33 is activated. This mode is used to rinse heated water through the mixing and whipping chambers 50, 52 for cleaning these chambers. Periodic rinsing of these chambers will help prevent accumulation of beverage therein and maintain sanitary conditions.

Additionally, the run/rinse switch 200 may be used to rinse a corresponding mixing assembly 40 and to dispense hot water therefrom after rinsing any remaining beverage therefrom. In this regard, the apparatus may also dispense heated water.

I claim:

1. A powdered beverage mixing and dispensing apparatus having a housing containing at least one powdered beverage substance hopper for retaining a powdered beverage substance;

a powder stirring and dispensing mechanism coupled to said hopper for stirring the powdered beverage substance within the hopper and dispensing the powdered beverage substance from the hopper;

a heated water dispensing system to controllably dispense a desired quantity of heated water for combination with a quantity of dispensed powdered beverage substance;

a mixing assembly communicating with said at least one hopper for receiving powdered beverage substance dispensed therefrom and communicating with said heated water dispensing system for mixing said powdered beverage substance and heated water to produce a beverage;

a moisture removal assembly positioned between said at least one hopper and said mixing assembly for removing moisture produced by heated water mixed in said mixing assembly to reduce intrusion of said removed moisture into said powdered beverage substance retained in said at least one hopper;

a vent tube communicating with said heated water dispensing system for minimizing the accumulation of gas bubbles in a heated water dispensing line of said heated water dispensing system; and a controllable by-pass water system communicating with said heated water dispensing system for introducing unheated water into said mixing assembly for mixing with said powdered beverage substance to selectively produce unheated beverages.

2. A powdered beverage mixing and dispensing apparatus as recited in claim 1, said mixing assembly further comprising:

a mixing chamber having an open upper end for receiving powdered beverage substance therethrough and communicating with a water dispensing line for dispensing water into said mixing chamber for mixing with said powdered beverage substance dispensed therein;

a whipping chamber communicating with said mixing chamber;

a frothing mechanism extending into said whipping chamber for mechanically agitating the mixed water and powdered beverage substance; and a dispensing nozzle communicating with said whipping chamber to dispense a beverage therefrom.

3. A powdered beverage mixing and dispensing apparatus as recited in claim 2, said frothing mechanism further comprising:

a frothing blade positioned in said whipping chamber;

a motor coupled to said frothing blade for rotating said frothing blade to agitate a combination of water and powdered beverage substance dispensed to said whipping chamber from said mixing chamber; and wherein operation of said frothing blade by said motor mechanically agitates and thoroughly combines water and powdered beverage substance to produce a desired beverage.

4. A powdered beverage mixing and dispensing apparatus as recited in claim 1, said powder stirring and dispensing mechanism further comprising:

an auger positioned in a lower portion of said hopper;

a motor connected to said auger for rotating said auger to move powdered beverage substance through said hopper towards a dispensing outlet cooperatively positioned relative to said auger; and an agitator disk positioned in said hopper having teeth positioned on a circumferential edge thereof for engagement with said auger, operation of said auger by said auger motor moving said agitator disk having said teeth engaged with said auger to rotate said agitator disk in said powdered beverage substance.

5. A powdered beverage mixing and dispensing apparatus as recited in claim 4, said agitator disk further comprising:

at least one fin attached to said agitator disk extending from a plane of rotation of said agitator disk.

6. A powdered beverage mixing and dispensing apparatus as recited in claim 4, said agitator disk further comprising:

at least one agitator wire attached to and movable relative to said agitator disk, said agitator wire being retained on said disk and spaced therefrom, said agitator wire having a dimension facilitating extension from said attachment point to beyond the circumferential edge of said agitator disk for engagement with said auger.

7. A powdered beverage mixing and dispensing apparatus as recited in claim 1, said moisture removal assembly further comprising:

an annular channel structure positioned over said upper end of said mixing chamber, said annular channel structure defining a mouth opening towards said mixing chamber for receiving moisture therein;

a vent tube coupled to said annular channel structure;

an exhaust assembly communicating with said vent tube, said exhaust assembly drawing air through said vent tube from said annular channel structure and removing moist air moved thereby away from said at least one hopper; and wherein said exhaust assembly, steam tube, and annular channel structure collect and remove moisture from said mixing chamber to prevent intrusion of said moisture into said powdered beverage substance retained in said hopper to prevent clumping and caking of said powdered beverage substance.

8. A powdered beverage mixing and dispensing apparatus as recited in claim 1, said heated water dispensing system further comprising:

at least one water dispensing line coupled to a heated water reservoir and to said mixing assembly, said water dispensing line being disposed on generally continuous inclined path between said heated water reservoir and said mixing assembly for promoting gravity flow and draining of said water dispensing line.

9. A powdered beverage mixing and dispensing apparatus as recited in claim 1, said heated water dispensing system including an inlet line providing water to said apparatus, a heated water reservoir communicating with said inlet line for receiving water, at least one water dispensing line communicating with said heated water reservoir for controllably dispensing heated water from said reservoir to a corresponding mixing assembly, said by-pass water system further comprising:

a controllable by-pass solenoid valve communicating with said inlet line;

a by-pass line communicating with said solenoid valve and with a corresponding water dispensing line; and wherein operation of said by-pass solenoid valve controllably introduces unheated water from said inlet line through said by-pass line to said water dispensing line to provide unheated water to said mixing assembly.

10. A powdered beverage mixing and dispensing apparatus as recited in claim 1, further comprising an illuminated display positioned at a front face of said housing, said illuminated display comprising:

a frame structure;

a window defined in said frame structure;

a display panel retained against said window; and a lamp assembly positioned in said frame structure providing illumination from behind said display panel for projecting light through said display panel and illuminating said display panel.

11. A powdered beverage mixing and dispensing apparatus, said apparatus including at least one hopper for retaining a quantity of powdered beverage substance therein, an auger positioned in said hopper and attached to an auger motor for moving powdered beverage substance through said hopper toward a dispensing outlet in said hopper for controllably dispensing a desired quantity of powdered beverage substance from said hopper, a stirring mechanism engaged with the auger including an agitator disk retained in said hopper having teeth along a circumferential edge thereof engagable with said auger, and agitator structure on said disk and having a dimension facilitating extension beyond the circumferential edge of said agitator disk, wherein operation of said auger by said auger motor rotates said agitator disk and said agitator structure retained thereon in said hopper to agitate said powdered beverage substance retained therein, said agitator disk having at least one fin attached to said agitator disk extending from a plane of rotation of said agitator disk, and at least two agitator wires attached to and spaced away from said agitator disk, said agitator wires being retained on opposite sides of said disk, said agitator wires having a dimension facilitating extension beyond the circumferential edge of said agitator disk.

12. A powdered beverage mixing and dispensing apparatus having at least one hopper for retaining a quantity of powdered beverage substance and means associated therewith for dispensing said substance from said hopper, a heated water dispensing system for controllably dispensing a quantity of heated water for mixing with a quantity of powdered beverage substance, a mixing assembly positioned for receiving powdered beverage substance from said hopper and communicating with said heated water dispensing system to receive and mix powdered beverage substance and heated water to produce a beverage therein, said heated water dispensing system including a heated water reservoir and at least one dispensing line communicating with said reservoir and said mixing assembly, said dispensing line being positioned on an inclined path from said reservoir to said mixing assembly so as to provide gravity delivery of water from said reservoir to said mixing assembly and to promote draining of said dispensing line after each dispensing cycle, a vent tube communicating with said dispensing line in close proximity to said reservoir for promoting draining of said dispensing line at the completion of a dispensing cycle and for minimizing the accumulation of bubbles in said dispensing line so as to promote consistent dispensing of water through said dispensing line, said heated water dispensing system including an inlet line providing water to said apparatus, a heated water reservoir communicating with said inlet line for receiving water, said dispensing line communicating with said heated water reservoir for controllably dispensing heated water from said reservoir to a corresponding mixing assembly, and a by-pass water system comprising: a bypass solenoid valve communicating with said inlet line; and a by-pass line communicating with said by-pass solenoid valve and with a corresponding water dispensing line, wherein operation of said by-pass solenoid valve introduces unheated water from said inlet line through said by-pass line to said water dispensing line to provide unheated water to said mixing assembly.

13. A powdered beverage mixing and dispensing apparatus as recited in claim 12, said by-pass water system further comprising an adjustment valve positioned between and communicating with said by-pass solenoid valve and said by-pass line, said adjustment valve providing controlled adjustment of flow through said by-pass line to regulate the flow rate of bypass water introduced into the water dispensing line.

14. A powdered beverage mixing and dispensing apparatus having a housing containing at least one powdered beverage substance hopper for retaining a powdered beverage substance;

a powder stirring and dispensing mechanism coupled to said hopper for stirring the powdered beverage substance within the hopper and dispensing the powdered beverage substance from the hopper;

a heated water dispensing system to controllably dispense a desired quantity of heated water for combination with a quantity of dispensed powdered beverage substance;

a mixing assembly communicating with said at least one hopper for receiving powdered beverage substance dispensed therefrom and communicating with said heated water dispensing system for mixing said powdered beverage substance and heated water to produce a beverage;

a moisture removal assembly positioned between said at least one hopper and said mixing assembly for removing moisture produced by heated water mixed in said mixing assembly to reduce intrusion of said removed moisture into said powdered beverage substance retained in said at least one hopper;

a vent tube communicating with said heated water dispensing system for minimizing the accumulation of gas bubbles in a heated water dispensing line of said heated water dispensing system;

said powder stirring and dispensing mechanism further comprising an auger positioned in a lower portion of said hopper, a motor connected to said auger for rotating said auger to move powdered beverage substance through said hopper towards a dispensing outlet cooperatively positioned relative to said auger, and an agitator disk positioned in said hopper having teeth positioned on a circumferential edge thereof for engagement with said auger, operation of said auger by said auger motor moving said agitator disk having said teeth engaged with said auger to rotate said agitator disk in said powdered beverage substance; and said agitator disk farther comprising at least one agitator wire attached to and movable relative to said agitator disk, said agitator wire being retained on said disk and spaced therefrom, said agitator wire having a dimension facilitating extension from said attachment point to beyond the circumferential edge of said agitator disk for engagement with said auger.

15. A powdered beverage mixing and dispensing apparatus, said apparatus including at least one hopper for retaining a quantity of powdered beverage substance therein, an auger positioned in said hopper and attached to an auger motor for moving powdered beverage substance through said hopper toward a dispensing outlet in said hopper for controllably dispensing a desired quantity of powdered beverage substance from said hopper, and a stirring mechanism engaged with the auger including a disk retained in said hopper having teeth along a circumferential edge thereof engagable with said auger, at least one agitator wire attached to and spaced away from said agitator disk, and wherein movement of said auger by said auger motor rotates said agitator disk and said agitator wire retained thereon in said hopper to agitate said powdered beverage substance retained therein.

16. A powdered beverage mixing and dispensing apparatus as recited in claim 15, said agitator disk further comprising:

at least one fin attached to said agitator disk extending from a plane of rotation of said agitator disk.

17. A powdered beverage mixing and dispensing apparatus as recited in claim 15, further comprising:

said agitator wire having a dimension facilitating extension from said attachment point to beyond the circumferential edge of said agitator disk for engagement with said auger.

18. A powdered beverage mixing and dispensing apparatus as recited in claim 15, said agitator disk further comprising:

at least one fin attached to said agitator disk extending from a plane of rotation of said agitator disk; and at least two agitator wires attached to and spaced away from said agitator disk, said agitator wires being retained on opposite sides of said disk, said agitator wires having a dimension facilitating extension from said attachment point to beyond the circumferential edge of said agitator disk for engagement with said auger.

19. A powdered beverage mixing and dispensing apparatus having at least one hopper for retaining a quantity of powdered beverage substance and means associated therewith for dispensing said substance from said hopper, a heated water dispensing system for controllably dispensing a quantity of heated water for mixing with a quantity of powdered beverage substance, a mixing assembly positioned for receiving powdered beverage substance from said hopper and communicating with said heated water dispensing system to receive and mix powdered beverage substance and heated water to produce a beverage therein, said heated water dispensing system including a heated water reservoir and at least one dispensing line communicating with said reservoir and said mixing assembly, said dispensing line being positioned on an inclined path from said reservoir to said mixing assembly so as to provide gravity delivery of water from said reservoir to said mixing assembly and to promote draining of said dispensing line after each dispensing cycle, a vent tube communicating with said dispensing line in close proximity to said reservoir for promoting draining of said dispensing line at the completion of a dispensing cycle and for minimizing the accumulation of bubbles in said dispensing line so as to promote consistent dispensing of water through said dispensing lines, said vent tube being configured with respect to said dispensing line such that water flowing through the dispensing line backs up in the vent tube thereby scaling off the vent tube, wherein the water in the vent tube drains through said dispensing line at the completion of the dispensing cycle thereby proviving consistent quantities of water dispensed.

20. A powdered beverage mixing and dispensing apparatus as recited in claim 19, further comprising:

said heated water dispensing system including an inlet water line and an inlet solenoid valve for controllably adding water to said heated water reservoir, said heated water dispensing system including a solenoid valve communicating with an upper portion of said heated water reservoir and a corresponding dispensing line to controllably dispense water from said upper portion of said heated water reservoir to said dispensing line.

21. A powdered beverage mixing and dispensing apparatus as recited in claim 20, said water dispensing line being attached to said mixing assembly to introduce water dispensed therefrom into said mixing assembly at a tangential point of entry, said mixing assembly having a wall with a tangential entry aperture communicating with said dispensing line to promote tangential entry and swirling action of water dispensed through said water dispensing line into said mixing chamber, wherein tangential entry and swirling of water introduced into said mixing chamber promotes mixing of water and beverage powder dispensed into said mixing chamber.

22. A powdered beverage mixing and dispensing apparatus as recited in claim 19, said heated water dispensing system including an inlet line providing water to said apparatus, a heated water reservoir communicating with said inlet line for receiving water, said dispensing line communicating with said heated water reservoir for controllably dispensing heated water from said reservoir to a corresponding mixing assembly, and a by-pass water system comprising:

a by-pass solenoid valve communicating with said inlet line;

a by-pass line communicating with said by-pass solenoid valve and with a corresponding water dispensing line; and wherein operation of said by-pass solenoid valve introduces unheated water from said inlet line through said by-pass line to said water dispensing line to provide unheated water to said mixing assembly.

23. A powdered beverage mixing and dispensing apparatus as recited in claim 22, said by-pass water system further comprising an adjustment valve positioned between and communicating with said by-pass solenoid valve and said by-pass line, said adjustment valve providing controlled adjustment of flow through said by-pass line to regulate the flow rate of by-pass water introduced into the water dispensing line.

24. A powdered beverage mixing and dispensing apparatus as recited in claim 19, further comprising a moisture removal assembly having:

an annular channel structure positioned over an upper end of said mixing assembly, said annular channel structure defining a mouth opening towards said mixing assembly for receiving vapor therein;

a vent tube coupled to said annular channel structure;

an exhaust assembly communicating with said vent tube, said exhaust assembly drawing air through said vent tube from said annular channel structure and removing moist air removed thereby away from said at least one hopper; and wherein said exhaust assembly, vent tube, and annular channel structure collect and remove moisture from said mixing chamber to prevent intrusion of said moisture into said powdered beverage substance retained in said hopper to prevent clumping of said powdered beverage substance.

25. A powdered beverage mixing and dispensing apparatus having a housing containing at least one powdered beverage substance hopper for retaining a powdered beverage substance;

a powder stirring and dispensing mechanism coupled to said hopper for stirring the powdered beverage substance within the hopper and dispensing the powdered beverage substance from the hopper;

a heated water dispensing system to controllably dispense a desired quantity of heated water for combination with a quantity of dispensed powdered beverage substance;

a mixing assembly communicating with said at least one hopper for receiving powdered beverage substance dispensed therefrom and communicating with said heated water dispensing system for mixing said powdered beverage substance and heated water to produce a beverage;

a moisture removal assembly positioned between said at least one hopper and said mixing assembly for removing moisture produced by heated water mixed in said mixing assembly to reduce intrusion of said removed moisture into said powdered beverage substance retained in said at least one hopper; and a controllable by-pass water system communicating with said heated water dispensing system for introducing unheated water into said mixing assembly for mixing with said powdered beverage substance to selectively produce unheated beverages.

26. A powdered beverage mixing and dispensing apparatus as recited in claim 25, said mixing assembly further comprising:

a mixing chamber having an open upper end for receiving powdered beverage substance therethrough and communicating with a water dispensing line for dispensing water into said mixing chamber for mixing with said powdered beverage substance dispensed therein;

a whipping chamber communicating with said mixing chamber;

a frothing mechanism extending into said whipping chamber for mechanically agitating the mixed water and powdered beverage substance; and a dispensing nozzle communicating with said whipping chamber to dispense a beverage therefrom.

27. A powdered beverage mixing and dispensing apparatus as recited in claim 25, said powder stirring and dispensing mechanism further comprising:

an auger positioned in a lower portion of said hopper;

a motor connected to said auger for rotating said auger to move powdered beverage substance through said hopper towards a dispensing outlet cooperatively positioned relative to said auger; and an agitator disk positioned in said hopper having teeth positioned on a circumferential edge thereof for engagement with said auger, operation of said auger by said auger motor moving said agitator disk having said teeth engaged with said auger to rotate said agitator disk in said powdered beverage substance.

28. A powdered beverage mixing and dispensing apparatus as recited in claim 27, said agitator disk further comprising:

at least one fin attached to said agitator disk extending from a plane of rotation of said agitator disk.

29. A powdered beverage mixing and dispensing apparatus as recited in claim 27, said agitator disk further comprising:

at least one agitator wire attached to and movable relative to said agitator disk, said agitator wire being retained on said disk and spaced therefrom, said agitator wire having a dimension facilitating extension from said attachment point to beyond the circumferential edge of said agitator disk for engagement with said auger.

30. A powdered beverage mixing and dispensing apparatus as recited in claim 25, said heated water dispensing system further comprising:

at least one water dispensing line coupled to a heated water reservoir and to said mixing assembly, said water dispensing line being disposed on generally continuous inclined path between said heated water reservoir and said mixing assembly for promoting gravity flow and draining of said water dispensing line.

31. A powdered beverage mixing and dispensing apparatus as recited in claim 25, said heated water dispensing system including an inlet line providing water to said apparatus, a heated water reservoir communicating with said inlet line for receiving water, at least one water dispensing line communicating with said heated water reservoir for controllably dispensing heated water from said reservoir to a corresponding mixing assembly, said by-pass water system further comprising:

a controllable by-pass solenoid valve communicating with said inlet line;

a by-pass line communicating with said solenoid valve and with a corresponding water dispensing line; and wherein operation of said by-pass solenoid valve controllably introduces unheated water from said inlet line through said by-pass line to said water dispensing line to provide unheated water to said mixing assembly.

32. A powdered beverage mixing and dispensing apparatus having a housing containing at least one powdered beverage substance hopper for retaining a powdered beverage substance;

a powder stirring and dispensing mechanism coupled to said hopper for stirring the powdered beverage substance within the hopper and dispensing the powdered beverage substance from the hopper;

a heated water dispensing system to controllably dispense a desired quantity of heated water for combination with a quantity of dispensed powdered beverage substance;

a mixing assembly communicating with said at least one hopper for receiving powdered beverage substance dispensed therefrom and communicating with said heated water dispensing system for mixing said powdered beverage substance and heated water to produce a beverage;

a moisture removal assembly positioned between said at least one hopper and said mixing assembly for removing moisture produced by heated water mixed in said mixing assembly to reduce intrusion of said removed moisture into said powdered beverage substance retained in said at least one hopper;

a vent tube communicating with said heated water dispensing system for minimizing the accumulation of gas bubbles in a heated water dispensing line of said heated water dispensing system, said vent tube being configured with respect to said heated water dispensing line such that water flowing through the dispensing line backs up in the vent tube thereby sealing off the vent tube, wherein the water in the vent tube drains through said heated water dispensing line at the completion of a dispensing cycle thereby proviving consistent quantities of water dispensed.

33. A powdered beverage mixing and dispensing apparatus as recited in claim 32, said mixing assembly further comprising:

a mixing chamber having an open upper end for receiving powdered beverage substance therethrough and communicating with said heated water dispensing line for dispensing water into said mixing chamber for mixing with said powdered beverage substance dispensed therein;

a whipping chamber communicating with said mixing chamber;

a frothing mechanism extending into said whipping chamber for mechanically agitating the mixed water and powdered beverage substance; and a dispensing nozzle communicating with said whipping chamber to dispense a beverage therefrom.

34. A powdered beverage mixing and dispensing apparatus as recited in claim 32, said powder stirring and dispensing mechanism further comprising:

an auger positioned in a lower portion of said hopper;

a motor connected to said auger for rotating said auger to move powdered beverage substance through said hopper towards a dispensing outlet cooperatively positioned relative to said auger; and an agitator disk positioned in said hopper having teeth positioned on a circumferential edge thereof for engagement with said auger, operation of said auger by said auger motor moving said agitator disk having said teeth engaged with said auger to rotate said agitator disk in said powdered beverage substance.

35. A powdered beverage mixing and dispensing apparatus as recited in claim 34, said agitator disk further comprising:

at least one fin attached to said agitator disk extending from a plane of rotation of said agitator disk.

36. A powdered beverage mixing and dispensing apparatus as recited in claim 34, said agitator disk further comprising:

at least one agitator wire attached to and movable relative to said agitator disk, said agitator wire being retained on said disk and spaced therefrom, said agitator wire having a dimension facilitating extension from said attachment point to beyond the circumferential edge of said agitator disk for engagement with said auger.

37. A powdered beverage mixing and dispensing apparatus as recited in claim 32, wherein said heated water dispensing line is coupled to a heated water reservoir and to said mixing assembly, said heated water dispensing line being disposed on generally continuous inclined path between said heated water reservoir and said mixing assembly for promoting gravity flow and draining of said heated water dispensing line.

38. A powdered beverage mixing and dispensing apparatus as recited in claim 32, said heated water dispensing system including an inlet line providing water to said apparatus, a heated water reservoir communicating with said inlet line for receiving water, said heated water dispensing line communicating with said heated water reservoir for controllably dispensing heated water from said reservoir to said mixing assembly, further comprising a by-pass water system comprising:

a controllable by-pass solenoid valve communicating with said inlet line;

a by-pass line communicating with said solenoid valve and with said heated water dispensing line; and wherein operation of said by-pass solenoid valve controllably introduces unheated water from said inlet line through said by-pass line to said water dispensing line to provide unheated water to said mixing assembly.

39. A powdered beverage mixing and dispensing apparatus, said apparatus including at least one hopper for retaining a quantity of powdered beverage substance therein, an auger positioned in said hopper and attached to an auger motor for moving powdered beverage substance through said hopper toward a dispensing outlet in said hopper for controllably dispensing a desired quantity of powdered beverage substance from said hopper, and a stirring mechanism engaged with the auger including a disk retained in said hopper having teeth along a circumferential edge thereof engagable with said auger, and an agitator wire on said disk and having a dimension facilitating extension beyond the circumferential edge of said agitator disk, wherein operation of said auger by said auger motor rotates said agitator disk and said agitator wire retained thereon in said hopper to agitate said powdered beverage substance retained therein.

\* \* \* \* \*

UNITED STATES PATENT AND TRADEMARK OFFICE
CERTIFICATE OF CORRECTION

PATENT NO. : 5,918,768
DATED : July 6, 1999
INVENTOR(S) : David F. Ford

It is certified that error appears in the above-identified patent and that said Letters Patent is hereby corrected as shown below:

Column 13, Line 8 "farther" should be -- further --

Column 14, Line 15 "proviving" should be -- providing --

Column 17, Line 16 "proviving " should be -- providing --

Signed and Sealed this

Eighteenth Day of April, 2000

Attest:

Q. TODD DICKINSON

*Attesting Officer*     *Director of Patents and Trademarks*